(12) United States Patent
Ji et al.

(10) Patent No.: US 11,948,079 B2
(45) Date of Patent: Apr. 2, 2024

(54) MULTI-AGENT COORDINATION METHOD AND APPARATUS

(71) Applicant: TSINGHUA UNIVERSITY, Beijing (CN)

(72) Inventors: Xiangyang Ji, Beijing (CN); Shuncheng He, Beijing (CN)

(*) Notice: Subject to any disclaimer, the term of this patent is extended or adjusted under 35 U.S.C. 154(b) by 628 days.

(21) Appl. No.: 17/073,547

(22) Filed: Oct. 19, 2020

(65) Prior Publication Data

US 2022/0121920 A1 Apr. 21, 2022

(51) Int. Cl.
*G06N 3/08* (2023.01)
*G06F 18/214* (2023.01)
*G06F 18/2415* (2023.01)
*G06N 5/043* (2023.01)

(52) U.S. Cl.
CPC ........... *G06N 3/08* (2013.01); *G06F 18/2155* (2023.01); *G06F 18/2415* (2023.01); *G06N 5/043* (2013.01)

(58) Field of Classification Search
CPC ...... G06N 3/08; G06N 5/043; G06F 18/2155; G06F 18/2415
See application file for complete search history.

(56) References Cited

U.S. PATENT DOCUMENTS

| 10,960,539 B1* | 3/2021 | Kalakrishnan ......... B25J 9/1679 |
| 2017/0213150 A1* | 7/2017 | Arel ...................... G06N 3/042 |
| 2020/0125957 A1* | 4/2020 | Lu .......................... G06F 17/16 |

OTHER PUBLICATIONS

Ryan Lowe, Multi-Agent Actor-Critic for Mixed Cooperative-Competitive Environments, 2017, OpenAI, Reposted on arXiv: 1706.02275v4 Mar. 14, 2020, p. 5 (Year: 2017).*

Sebastian Rudder, An overview of gradient descent optimization algorithms, Insight Centre for Data Analytics, NUI Galway, p. 1, Section 1, published Jun. 15, 2017, arXiv: 1609.04747v2 (Year: 2017).*

* cited by examiner

*Primary Examiner* — Li B. Zhen
*Assistant Examiner* — Henry Nguyen
(74) *Attorney, Agent, or Firm* — Helen Mao; Imperium Patent Works (57) ABSTRACT

The present disclosure discloses a multi-agent coordination method. The method includes: performing multiple data collections on N agents to collect E sets of data, where N and E are integers greater than 1; and optimizing neural networks of the N agents using reinforcement learning based on the E sets of data. Each data collection includes: randomly selecting a first coordination pattern from multiple predetermined coordination patterns; obtaining N observations after the N agents act on an environment in the first coordination pattern; determining a first probability and a second probability that a current coordination pattern is the first coordination pattern based on the N observations; and determining a pseudo reward based on the first probability and the second probability. The E sets of data include: a first coordination pattern label indicating the first coordination pattern, the N observations, and the pseudo reward.

18 Claims, 4 Drawing Sheets

MULTI-AGENT COORDINATION METHOD AND APPARATUS

TECHNICAL FIELD

The present disclosure relates to the field of multi-agent reinforcement learning technologies, and more particularly, to a multi-agent coordination method and apparatus.

BACKGROUND

Reinforcement learning is a complex machine learning method, aiming to solve a class of sequential decision-making problems. For such class of sequential decision-making problems, an agent needs to perceive information (such as visual information collected by a robot, an angle of an arm of the robot, and state information such as a speed thereof) from an environment, calculate an action through a built-in model, and then apply the action to the environment. In the reinforcement learning, the agent repeatedly interacts with the environment, in order to maximize a reward from the environment. Different from conventional machine learning methods such as computer vision and natural language processing, the reinforcement learning is dedicated to solving more general problems, such as gaming, intelligent navigation, human-computer interaction, robot control, and so on. Therefore, the reinforcement learning has a promising future in achieving general artificial intelligence and is currently the cutting-edge research field.

The reinforcement learning usually focuses on interactions between a single agent and the environment, but issues related to multiple agents are also worth studying. Dispatching in the transportation network, multi-party game, robot cluster coordination and other issues involve multiple agents. In a multi-agent issue, multiple agents make decisions at the same time and influence each other to achieve a common goal. Each agent needs to consider not only its own impact on the environment, but also behaviors of other agents. In an ideal situation, through the reinforcement learning, multiple agents may collaborate with each other, thereby improving efficiency and obtaining higher rewards from the environment.

At present, the acquisition of a coordination pattern among multiple agents depends on a specific task and goal (i.e., a specific reward function). However, when the task changes, the agents need to resume learning and to be trained again, leading to the low efficiency.

SUMMARY

In view of the above problems, the present disclosure provides an unsupervised multi-agent coordination mechanism to allow multiple agents to spontaneously explore an environment and form different coordination patterns in the environment without any reward.

A first aspect of the present disclosure provides a multi-agent coordination method, including: performing a plurality of data collections on N agents to collect E sets of data, where N and E are integers greater than 1; and optimizing neural networks of the N agents using reinforcement learning based on the E sets of data. Each data collection includes: randomly selecting a first coordination pattern from a plurality of predetermined coordination patterns; obtaining N observations after the N agents act on an environment in the first coordination pattern; determining a first probability and a second probability that a current coordination pattern is the first coordination pattern based on the N observations; and determining a pseudo reward based on the first probability and the second probability. The E sets of data include a first coordination pattern label indicating the first coordination pattern, the N observations, and the pseudo reward.

A second aspect of the present disclosure provides a multi-agent coordination apparatus. The apparatus includes: N agents, in which each agent includes a sensor, an executor and a neural network, and N is an integer greater than 1; and a central controller including a memory, a random label generator, N local discriminators, a global discriminator, and a trainer. The random label generator is configured to randomly select a first coordination pattern label from a plurality of prior probability distributions. The first coordination pattern label indicates a first coordination pattern for coordination among the N agents coordinate. Sensors of the N agents are configured to obtain N observations $x_t^{(1)}$, $x_t^{(2)}$, ..., $x_t^{(N)}$ of an environment under a state variable $s_t$ of the N agents in the first coordination pattern. Neural networks of the N agents are configured to determine action vectors $u_t^{(1)}$, $u_t^{(2)}$, ..., $u_t^{(N)}$ based on the N observations $x_t^{(1)}$, $x_t^{(2)}$, ..., $x_t^{(N)}$ under the state variable $s_t$ and the first coordination pattern label, where t is any integer from 0 to N−1. Executors of the N agents are configured to apply actions to the environment based on the action vectors $u_t^{(1)}$, $u_t^{(2)}$, ..., $u_t^{(N)}$. The sensors of the N agents are further configured to obtain N observations $x_{t+1}^{(1)}$, $x_{t+1}^{(2)}$, ..., $x_{t+1}^{(N)}$ of the environment under a state variable $s_{t+1}$ at a next moment of the N agents in the first coordination pattern. Each of the N local discriminators is configured to determine a first probability that a current coordination pattern is the first coordination pattern based on a corresponding observation in the N observations $x_{t+1}^{(1)}$, $x_{t+1}^{(2)}$, ..., $x_{t+1}^{(N)}$. The global discriminator is configured to determine a second probability that the current coordination pattern is the first coordination pattern based on a set of the N observations $x_{t+1}^{(1)}$, $x_{t+1}^{(2)}$, ..., $x_{t+1}^{(N)}$. The central controller is configured to determine a pseudo reward based on the first probability and the second probability. The memory is configured to store the first coordination pattern label, the N observations $x_t^{(1)}$, $x_t^{(2)}$, ..., $x_t^{(N)}$, the N observations $x_{t+1}^{(1)}$, $x_{t+1}^{(2)}$, ..., $x_{t+1}^{(N)}$, the action vectors $u_t^{(1)}$, $u_t^{(2)}$, ..., $u_t^{(N)}$, and the pseudo reward. The trainer is configured to: extract from the memory the first coordination pattern label, observations at a current moment, action vectors at the current moment, the pseudo reward at the current moment, and observations at the next moment; optimize the neural networks of the N agents use reinforcement learning based on the first coordination pattern label, the observations at the current moment, the action vectors at the current moment, the pseudo reward at the current moment, and the observations at the next moment from the memory; and optimize the N local discriminators and the global discriminator using supervised learning based on the first coordination pattern label and the observations at the current moment.

BRIEF DESCRIPTION OF DRAWINGS

Embodiments of the present disclosure will be described below in combination with the accompanying drawings to make the above and other objectives, features and advantages of the present disclosure clearer.

DESCRIPTION OF EMBODIMENTS

Descriptions will now be made in detail to embodiments, examples of which are illustrated in the accompanying drawings. The same or similar elements and the elements having same or similar functions are denoted by like reference numerals throughout the descriptions. The embodiments described herein with reference to the drawings are explanatory, illustrative, and used to generally understand the present disclosure. The embodiments shall not be construed to limit the present disclosure.

The present disclosure proposes a method for obtaining a multi-agent coordination pattern by means of reinforcement learning under unsupervised conditions, aiming to improve the efficiency of multi-agent learning.

Figure 1:
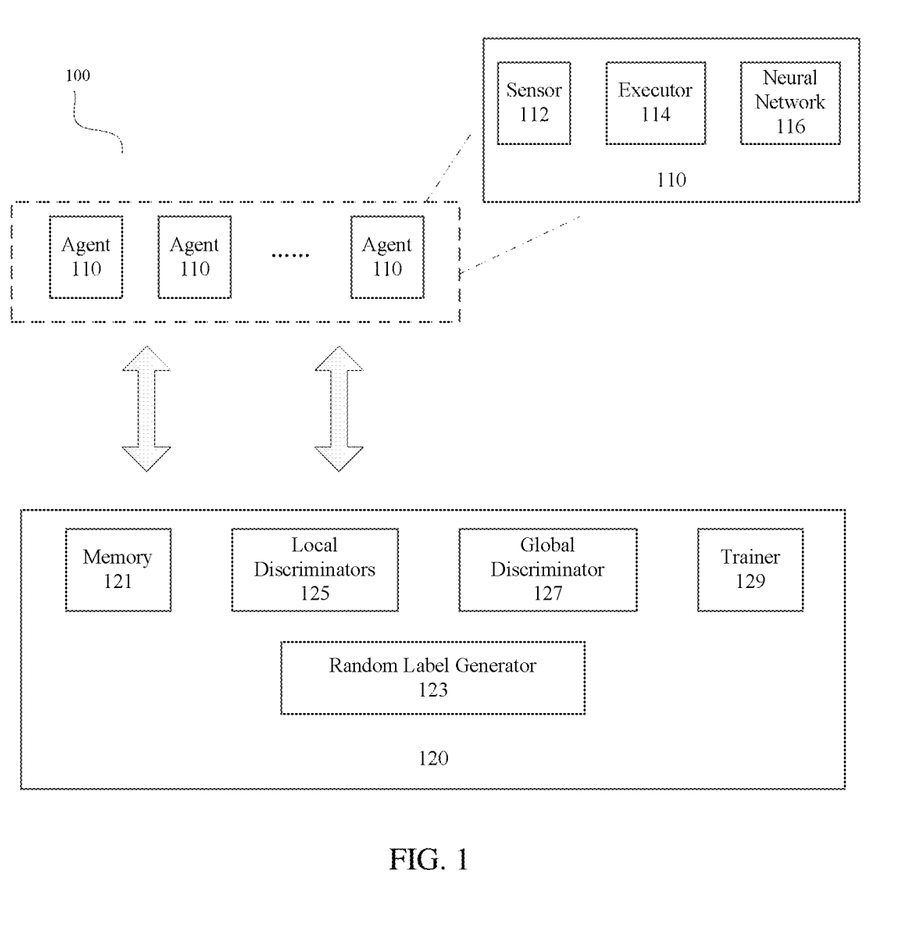
FIG. 1 is a schematic diagram of an application scenario of a multi-agent coordination system 100 according to embodiments of the present disclosure.

FIG. 1 is a schematic diagram of an application scenario of a multi-agent coordination system 100 according to embodiments of the present disclosure. The multi-agent coordination system 100 may be applied to dispatching of robot clusters, such as multi-robot coordinative search and rescue. As illustrated in FIG. 1, the multi-agent coordination system 100 includes N agents 110 and a central controller 120, where N is an integer greater than 1. Each agent 110 is provided with a sensor 112, an executor 114, and a neural network 116 that takes an observation as an input and an action vector as an output. The observation is obtained by the sensor 112, and the executor 114 takes an action based on the action vector to exert an influence on an environment. The central controller 120 may include a memory (also known as a data pool), a random label generator 123, N local discriminators 125, a global discriminator 127 and a trainer 129. The memory 121 is configured to store empirical data. The empirical data includes a coordination pattern label, observations at a current moment, action vectors at the current moment, a "pseudo reward" at the current moment, observations at a next moment, and so on. The random label generator 123 is configured to randomly select a coordination pattern label z for each agent. Each of the N local discriminators 125 is configured to calculate a first probability that a current coordination pattern is a coordination pattern indicated by the coordination pattern label z based on observations obtained by a corresponding one of the N agents 110. The global discriminator 127 is configured to calculate a second probability that the current coordination pattern is the coordination pattern indicated by the coordination pattern label z based on a set of observations obtained by the N agents 110. The trainer 129 is configured to sample some empirical data from the data pool so as to train and optimize neural networks 116 of the N agents 110 based on reinforcement learning methods such as multi-agent deep deterministic policy gradient (MADDPG), and to train and optimize the N local discriminators 125 and the global discriminator 127 based on supervised learning methods such as a gradient backpropagation algorithm. For example, the central controller 120 may be implemented by one or more central processing units (CPUs).

In some implementations, the environment is a simulated environment, and the agent is one or more computer programs that interact with the simulated environment.

In some other implementations, the environment is a real-world environment, and the agent is a mechanical entity that interacts with the real-world environment. For example, the agent may be a robot that interacts with the environment to complete a specific task, or an autonomous or semi-autonomous vehicle that provides navigation in the environment.

Figure 2:
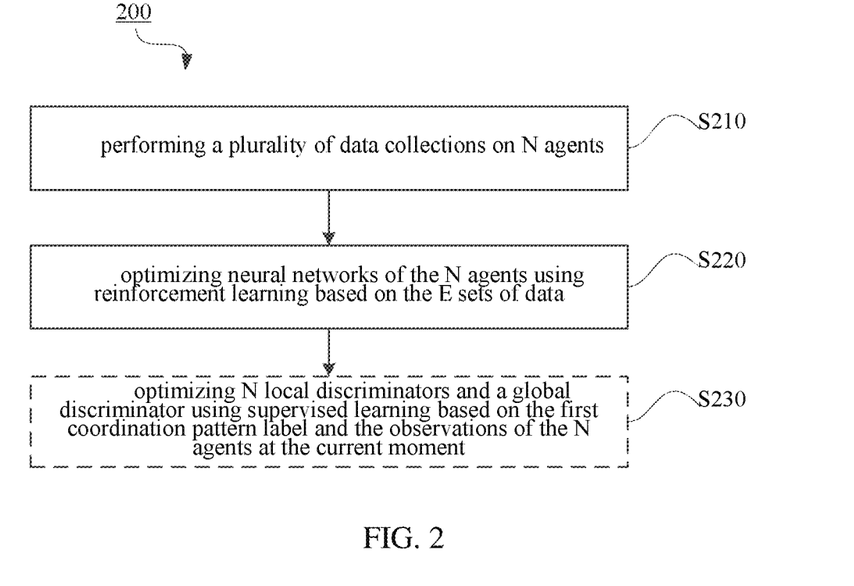
FIGS. 2-5 are flow charts illustrating a multi-agent coordination method 200 according to embodiments of the present disclosure.

FIG. 2 is a flow chart of a multi-agent coordination method 200 according to embodiments of the present disclosure. The multi-agent coordination method 200 may be executed in the multi-agent coordination system 100 illustrated in FIG. 1. The following description is made by taking the method 200 being executed in the system 100 as an example, but should not be construed to limit the present disclosure.

At block S210, the multi-agent coordination system 100 performs multiple data collections on N agents to collect E sets of data. N and E are integers greater than 1.

Figure 3:
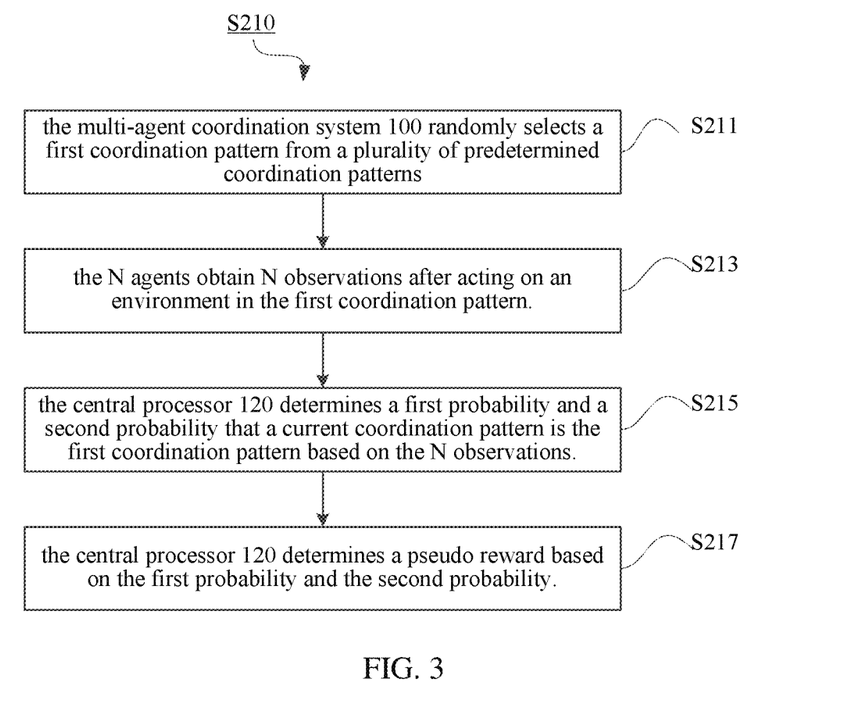

FIG. 3 is an exemplary implementation of each data collection in block S210 according to embodiments of the present disclosure.

As illustrated in FIG. 3, at block S211, the multi-agent coordination system 100 randomly selects a first coordination pattern from multiple predetermined coordination patterns. For example, the random label generator 123 randomly selects one coordination pattern label from multiple prior probability distributions as the first coordination pattern label z. The coordination pattern label z may be a discrete category label or a continuous real number label. When z is a discrete category label, a prior probability distribution p(z) is selected as a uniform distribution over K categories (K is a total number of categories). When z is a continuous real number label, the prior probability distribution p(z) is selected as a uniform distribution from −1 to +1.

At block S213, the N agents obtain N observations after acting on an environment in the first coordination pattern.

At block S215, the central processor 120 determines a first probability and a second probability that a current coordination pattern is the first coordination pattern based on the N observations.

At block S217, the central processor 120 determines a pseudo reward based on the first probability and the second probability.

Returning to FIG. 2, at block S220, the multi-agent coordination system 100 optimizes neural networks 116 of the N agents 110 using reinforcement learning based on the E sets of data. For example, the reinforcement learning may use multi-agent reinforcement learning methods such as multi-agent deep deterministic policy gradient (MADDPG).

The E sets of data include a first coordination pattern label indicating the first coordination pattern, the N observations, and the pseudo reward.

In an implementation, the E sets of data may also include observations of the N agents at a current moment, observations of the N agents at a next moment, and action vectors of the N agents acting on the environment at the current moment.

Further, block S220 may include optimizing the neural networks of the N agents using reinforcement learning based on the first coordination pattern label, the observations of the N agents at the current moment, the action vectors of the N agents acting on the environment at the current moment, the pseudo reward at the current moment, and the observations of the N agents at the next moment.

In an implementation, the multi-agent coordination method 200 may further include block S230. At block S230, the multi-agent coordination system 100 optimizes N local discriminators and a global discriminator using supervised learning based on the first coordination pattern label and the observations of the N agents at the current moment. For example, the supervised learning may adopt supervised learning methods such as the gradient backpropagation algorithm.

Figure 4:
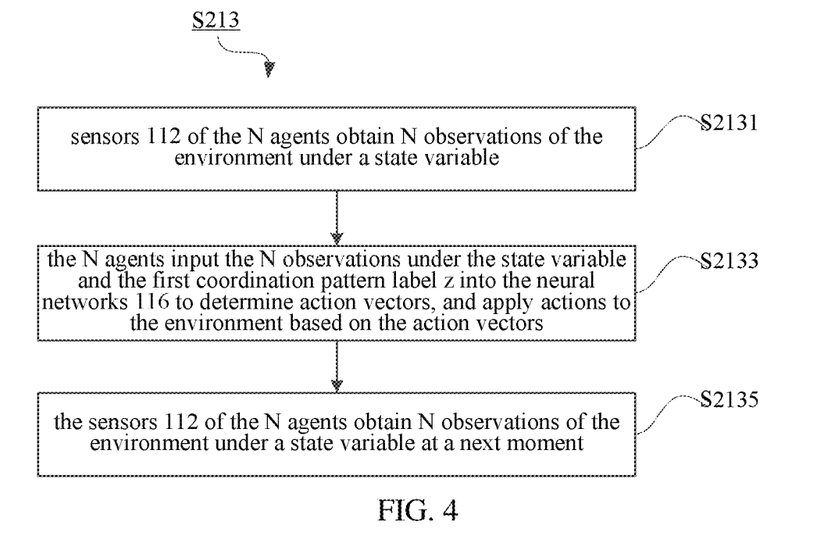

FIG. 4 is an exemplary implementation of block S213 according to embodiments of the present disclosure.

As illustrated in FIG. 4, at block S2131, sensors 112 of the N agents obtain N observations $x_t^{(1)}, x_t^{(2)}, \ldots, x_t^{(N)}$ of the environment under a state variable $s_t$.

At block S2133, the N agents input the N observations $x_t^{(1)}, x_t^{(2)}, \ldots, x_t^{(N)}$ under the state variable $s_t$ and the first coordination pattern label z into the neural networks 116 to determine action vectors $u_t^{(1)}, u_t^{(2)}, \ldots, u_t^{(N)}$, and apply actions to the environment based on the action vectors $u_t^{(1)}, u_t^{(2)}, \ldots, u_t^{(N)}$. In other words, mapping from the observation and the coordination pattern label to the action vector within each agent may be composed of an end-to-end neural network 116.

At block S2135, the sensors 112 of the N agents obtain N observations $x_{t+1}^{(1)}, x_{t+1}^{(2)}, \ldots, x_{t+1}^{(N)}$, i.e., the N observations after the N agents act on the environment in the first coordination pattern, of the environment under a state variable $s_{t+1}$ at a next moment.

In an implementation, if the observations are image information, the neural networks adopt a convolutional neural network (CNN) to process the image information, and adopt a recurrent neural network (RNN) or a long short-term memory (LSTM) to integrate information at a current moment and information previous to the current moment for outputting the action vectors.

In another implementation, if the observations are vector information, the neural networks adopt a multilayer perceptron (MLP) to process the vector information, and adopt a recurrent neural network (RNN) or a long short-term memory (LSTM) to integrate information at a current moment and information previous to the current moment for outputting the action vectors. The gradient of each neural network may be back-propagated or optimized.

Figure 5:
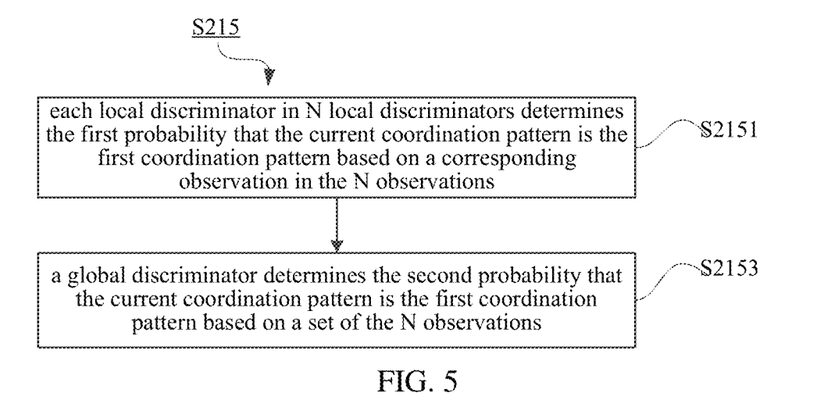

FIG. 5 is an exemplary implementation of block S215 according to embodiments of the present disclosure.

At block 52151, each local discriminator in the N local discriminators determines the first probability that the current coordination pattern is the first coordination pattern based on a corresponding observation in the N observations. For example, each local discriminator may determine the first probability based on the corresponding observation through the MLP.

At block 52153, the global discriminator determines the second probability that the current coordination pattern is the first coordination pattern based on a set of the N observations. For example, the global discriminator may determine the second probability based on the observations through the MLP.

Figure 6:
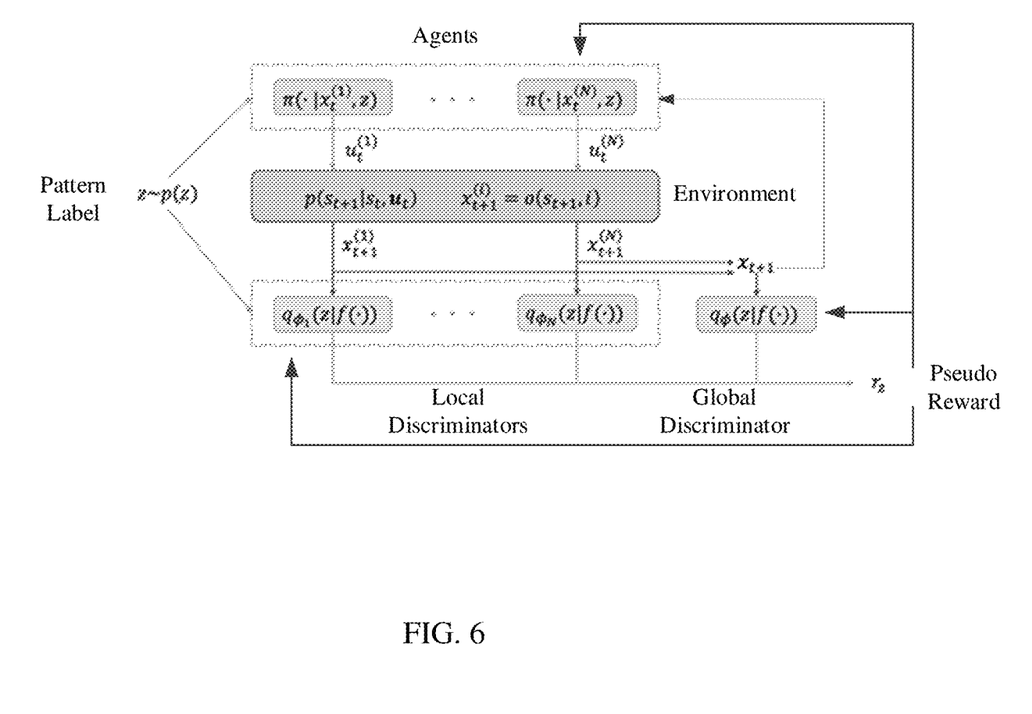
FIG. 6 is a diagram illustrating a physical quantity relationship of multi-agent coordination in the multi-agent coordination system 100 according to embodiments of the present disclosure.

The above process will be schematically described below in combination with FIG. 6. FIG. 6 is a diagram illustrating a physical quantity relationship of multi-agent coordination in the multi-agent coordination system 100 according to embodiments of the present disclosure.

As illustrated in FIG. 6, the multi-agent coordination process in the multi-agent coordination system may include a data collection phase (also called an execution phase) and an optimization phase (also called a training phase).

Data Collection Phase

First, the random label generator 123 of the central controller 120 randomly selects one coordination pattern label z from specified prior probability distributions. Once z is determined, the N agents may cooperate in a coordination pattern represented by z at moments from 0 to T.

At any moment t between 0 and T, an internal state variable of the environment is $s_t$. Each agent 110 obtains an observation of the environment through its own sensor 112. The observations of the N agents 110 are denoted as $x_t^{(1)}, x_t^{(2)}, \ldots, x_t^{(N)}$, and a set of the observations is denoted as $x_t$ (in bold). Each agent 110 inputs its own observation and the coordination pattern label z into its own neural network 116 (for example, a deep neural network), and then the neural network 116 outputs a corresponding action vector. The action vectors of the neural networks 116 of the N agents 110 are denoted as $u_t^{(1)}, u_t^{(2)}, \ldots, u_t^{(N)}$, and a set of the action vectors is denoted as $u_t$ (in bold).

After the action vectors $u_t$ are received by the environment, an internal state $s_{t+1}$ at the next moment is calculated based on its inherent state transition equation. The observations $x_{t+1}^{(1)}, x_{t+1}^{(2)}, \ldots, x_{t+1}^{(N)}$ at moment t+1 may be obtained through respective sensors 112 of the N agents 110. The N observations are inputted into corresponding local discriminators 125. The local discriminators 125 first extract specific features through an artificially set f(x) function, and then calculate probabilities that the current coordination pattern is the first coordination pattern based on the observations, that is, probabilities $q_{\phi_1}(z|f(x^{(1)})), q_{\phi_2}(z|f(x^{(2)})), \ldots, q_{\phi_N}(z|f(x^{(N)}))$ that the current coordination pattern label is z. In addition, the set of observations $x_{t+1}$ will be inputted into the global discriminator 127, and a corresponding probability $q_\phi(z|f(x))$ will be obtained through the same process as described above. Finally, the central controller 120 calculates the "pseudo reward" based on the following formula and feeds the "pseudo reward" back to the N agents 110:

$$r_z = \log q_\phi(z \mid f(x)) - \frac{1}{N} \sum_{k=1}^{N} \log q_{\phi_i}(z \mid f(x^{(i)})).$$

The above process starts at moment t=0, and iteratively proceeds until the moment t=T.

And then, the random label generator 123 of the central controller 120, again, randomly selects one coordination pattern label z from the specified prior probability distributions, and keeps repeating the above data collection phase from moments 0 to T until E sets of data are collected. All intermediate data are recorded and stored in the memory 121 of the central controller 120.

Optimization Phase

The central controller 120 randomly samples D sets of empirical data from the memory 121, extracts the coordination pattern label, the observations at the current moment, the action vectors at the current moment, the "pseudo reward" at the current moment as well as the observations at the next time from the empirical data, and optimizes the neural networks 116 of the N agents by using reinforcement learning methods such as MADDPG. Also, the central controller 120 extracts the coordination pattern label and the observations at the current moment from the empirical data, and optimizes the N local discriminators 125 and the global discriminator 127 by using supervised learning methods such as the gradient backpropagation algorithm.

The data collection phase and the optimization phase may be executed multiple times in a loop until the N agents 110 may show different coordination behaviors based on the inputted coordination pattern label z.

In the above embodiments, the global discriminator is responsible for inferring a coordination pattern label behind all the agents from the observations of all the agents, and each local discriminator is responsible for inferring a coordination pattern label behind each agent based on the observation of each agent. It may be seen from the calculation formula of "pseudo reward" that $r_z$ encourages agents to reflect the received different coordination pattern labels to different coordination behaviors among the agents, while suppressing expressions of the coordination pattern labels on behaviors of a single agent, so as to promote a group of agents to learn and obtain various coordination patterns independently without rewards from the environment.

For example, in a complex fire search and rescue scene, with the multi-agent coordination method provided by the present disclosure, in an unsupervised case where target search and rescue points are not specified, multiple robots may learn and explore different coordination patterns (such as group search, alternate search, centralized search and rescue, etc.) by using an existing multi-agent reinforcement learning algorithm, such that the robots may quickly adapt to new rescue scenes and adopt appropriate coordination patterns, thereby significantly improving search and rescue efficiency.

The above is only part of embodiments of the present disclosure. It should be noted that for those skilled in the art, several improvements and modifications may be made without departing from the principle of the present disclosure. The improvements and modifications should also be considered as the protection scope of the present disclosure.

What is claimed is:

1. A multi-agent coordination method, comprising:
performing a plurality of data collections on N agents to collect E sets of data, N and E being integers greater than 1; and
optimizing neural networks of the N agents using reinforcement learning based on the E sets of data,
wherein each data collection comprises:
randomly selecting a first coordination pattern from a plurality of predetermined coordination patterns;
obtaining N observations after the N agents act on an environment in the first coordination pattern;
determining a first probability and a second probability that a current coordination pattern is the first coordination pattern based on the N observations; and
determining a pseudo reward based on the first probability and the second probability, and
the E sets of data comprise: a first coordination pattern label indicating the first coordination pattern, the N observations, and the pseudo reward,
wherein the N agents are N robot agents, the environment is a real-world environment, and the N robot agents apply, based on action vectors determined by the optimized neural networks, actions corresponding to the action vectors to the real-world environment, and
said determining the pseudo reward based on the first probability and the second probability comprises:
calculating the pseudo reward based on:

$$r_z = \log q_\phi(z \mid f(x)) - \frac{1}{N} \sum_{i=1}^{N} \log q_{\phi_i}(z \mid f(x^{(i)})),$$

where $z$ represents the first coordination pattern, $r_z$ represents the pseudo reward, $x$ represents a set of the N observations, $x^{(i)}$ represents an i-th observation among the N observations, $f(\ )$ represents a feature extraction function, $q_{\phi_i}(z|f(x^{(i)}))$ represents the first probability that the current coordination pattern is the first coordination pattern $z$ based on the i-th observation $x^{(i)}$, and $q_\phi(z|f(x))$ represents the second probability that the current coordination pattern is the first coordination pattern $z$ based on the set of the N observations $x$.

2. The method according to claim 1, wherein the E sets of data further comprise: observations of the N agents at a current moment, observations of the N agents at a next moment, and action vectors of the N agents acting on the environment at the current moment.

3. The method according to claim 2, wherein said optimizing the neural networks of the N agents using reinforcement learning based on the E sets of data comprises:
optimizing the neural networks of the N agents using the reinforcement learning based on the first coordination pattern label, the observations of the N agents at the current moment, the action vectors of the N agents acting on the environment at the current moment, the pseudo reward at the current moment, and the observations of the N agents at the next moment.

4. The method according to claim 2, further comprising:
optimizing N local discriminators and a global discriminator using supervised learning based on the first coordination pattern label and the observations of the N agents at the current moment.

5. The method according to claim 1, wherein said randomly selecting the first coordination pattern from the plurality of predetermined coordination patterns comprises:
randomly selecting one coordination pattern label from a plurality of prior probability distributions as the first coordination pattern label.

6. The method according to claim 1, wherein said obtaining the N observations after the N agents act on the environment in the first coordination pattern comprises:
obtaining, by sensors of the N agents, N observations $x_t^{(1)}$, $x_t^{(2)}, \ldots, x_t^{(N)}$ of the environment under a state variable $s_t$;
inputting, by the N agents, the N observations $x_t^{(1)}$, $x_t^{(2)}, \ldots, x_t^{(N)}$ under the state variable $s_t$ and the first coordination pattern label into the neural networks to determine action vectors $u_t^{(1)}$, $u_t^{(2)}, \ldots, u_t^{(N)}$, and
applying, by the N agents, actions to the environment based on the action vectors $u_t^{(1)}$, $u_t^{(2)}, \ldots, u_t^{(N)}$; and
obtaining, by the sensors of the N agents, N observations $x_{t+1}^{(1)}$, $x_{t+1}^{(2)}, \ldots, x_{t+1}^{(N)}$ of the environment under a state variable $s_{t+1}$ at a next moment.

7. The method according to claim 6, wherein the observations are image information, and the neural networks adopt a convolutional neural network (CNN) to process the image information, and adopt a recurrent neural network (RNN) or a long short-term memory (LSTM) to integrate information at a current moment and information previous to the current moment for outputting the action vectors.

8. The method according to claim 6, wherein the observations are vector information, and the neural networks adopt a multilayer perceptron (MLP) to process the vector information, and adopt a recurrent neural network (RNN) or a long short-term memory (LSTM) to integrate information at a current moment and information previous to the current moment for outputting the action vectors.

9. The method according to claim 1, wherein said determining the first probability and the second probability that the current coordination pattern is the first coordination pattern based on the N observations comprises:

determining, by each local discriminator in N local discriminators, the first probability that the current coordination pattern is the first coordination pattern based on a corresponding observation in the N observations; and determining, by a global discriminator, the second probability that the current coordination pattern is the first coordination pattern based on a set of the N observations.

10. The method according to claim 9, wherein said determining, by each local discriminator, the first probability that the current coordination pattern is the first coordination pattern based on the corresponding observation in the N observations comprises:

determining the first probability based on the corresponding observation through a multilayer perceptron (MLP).

11. The method according to claim 9, wherein said determining, by the global discriminator, the second probability that the current coordination pattern is the first coordination pattern based on the set of the N observations comprises:

determining the second probability based on the set of the N observations through a multilayer perceptron (MLP).

12. The method according to claim 1, wherein the reinforcement learning adopts multi-agent deep deterministic policy gradient (MADDPG).

13. A multi-agent coordination apparatus, comprising:

N agents, each agent comprising a sensor, an executor and a neural network, and N being an integer greater than 1; and a central controller comprising a memory, a random label generator, N local discriminators, a global discriminator, and a trainer, wherein the random label generator is configured to randomly select a first coordination pattern label from a plurality of prior probability distributions, the first coordination pattern label indicating a first coordination pattern for coordination among the N agents;

sensors of the N agents are configured to obtain N observations $x_t^{(1)}, x_t^{(2)}, \ldots, x_t^{(N)}$ of an environment under a state variable $s_t$ of the N agents in the first coordination pattern;

neural networks of the N agents are configured to determine action vectors $u_t^{(1)}, u_t^{(2)}, \ldots, u_t^{(N)}$ based on the N observations $x_t^{(1)}, x_t^{(2)}, \ldots, x_t^{(N)}$ under the state variable $s_t$ and the first coordination pattern label, t being any integer from 0 to N−1;

executors of the N agents are configured to apply actions to the environment based on the action vectors $u_t^{(1)}, u_t^{(2)}, \ldots, u_t^{(N)}$;

the sensors of the N agents are further configured to obtain N observations $x_{t+1}^{(1)}, x_{t+1}^{(2)}, x_{t+1}^{(N)}$ of the environment under a state variable $s_{t+1}$ at a next moment of the N agents in the first coordination pattern;

each of the N local discriminators is configured to determine a first probability that a current coordination pattern is the first coordination pattern based on a corresponding observation in the N observations $x_{t+1}^{(1)}, x_{t+1}^{(2)}, \ldots, x_{t+1}^{(N)}$;

the global discriminator is configured to determine a second probability that the current coordination pattern is the first coordination pattern based on a set of the N observations $x_{t+1}^{(1)}, x_{t+1}^{(2)}, \ldots, x_{t+1}^{(N)}$;

the central controller is configured to determine a pseudo reward based on the first probability and the second probability;

the memory is configured to store the first coordination pattern label, the N observations $x_t^{(1)}, x_t^{(2)}, \ldots, x_t^{(N)}$, the N observations $x_{t+1}^{(1)}, x_{t+1}^{(2)}, \ldots, x_{t+1}^{(N)}$, the action vectors $u_t^{(1)}, u_t^{(2)}, \ldots, u_t^{(N)}$, and the pseudo reward; and the trainer is configured to: extract from the memory the first coordination pattern label, observations at a current moment, action vectors at the current moment, the pseudo reward at the current moment, and observations at the next moment; optimize the neural networks of the N agents using reinforcement learning based on the first coordination pattern label, the observations at the current moment, the action vectors at the current moment, the pseudo reward at the current moment, and the observations at the next moment from the memory; and optimize the N local discriminators and the global discriminator using supervised learning based on the first coordination pattern label and the observations at the current moment, wherein the N agents are N robot agents, the environment is a real-world environment, and the N robot agents apply, based on action vectors determined by the optimized neural networks, actions corresponding to the action vectors to the real-world environment, and said determining the pseudo reward based on the first probability and the second probability comprises:

calculating the pseudo reward based on:

$$r_z = \log q_\omega(z|f(x)) - 1/N \Sigma_{i=1}^N \log q_{\omega_i}(z|f(x^{(i)})),$$

where z represents the first coordination pattern, $r_z$ represents the pseudo reward, x represents a set of the N observations, $x^{(i)}$ represents an i-th observation among the N observations, f( ) represents a feature extraction function, $q_{\omega_i}(z|f(x^{(i)}))$ represents the first probability that the current coordination pattern is the first coordination pattern z based on the i-th observation $x^{(i)}$, and $q_\omega(z|f(x))$ represents the second probability that the current coordination pattern is the first coordination pattern z based on the set of the N observations x.

14. The apparatus according to claim 13, wherein the observations are image information, and the neural networks adopt a convolutional neural network (CNN) to process the image information, and adopt a recurrent neural network (RNN) or a long short-term memory (LSTM) to integrate information at a current moment and information previous to the current moment for outputting the action vectors.

15. The apparatus according to claim 13, wherein the observations are vector information, and the neural networks adopt a multilayer perceptron (MLP) to process the vector information, and adopt a recurrent neural network (RNN) or a long short-term memory (LSTM) to integrate information at a current moment and information previous to the current moment for outputting the action vectors.

16. The apparatus according to claim 13, wherein each of the N local discriminators is configured to:

determine the first probability based on the corresponding observation through a multilayer perceptron (MLP).

17. The apparatus according to claim 13, wherein the global discriminator is configured to:

determine the second probability based on the set of the N observations through a multilayer perceptron (MLP).

18. The apparatus according to claim 13, wherein the reinforcement learning adopts multi-agent deep deterministic policy gradient (MADDPG), or supervised learning adopts a gradient backpropagation algorithm, or the reinforcement learning adopts multi-agent deep deterministic policy gradient (MADDPG), and supervised learning adopts a gradient backpropagation algorithm.

* * * * *